Patented Sept. 14, 1937

2,092,825

UNITED STATES PATENT OFFICE 2,092,825

METHOD OF INCREASING VISCOSITY OF LATEX MIXES

Arthur Behr, Paris, France

No Drawing. Application June 18, 1936, Serial No. 86,021. In Great Britain June 14, 1935

4 Claims. (Cl. 18—50)

It has frequently been observed that it is interesting in the industries utilizing latex, to prepare the latex, with or without additions, so that the viscosity can be adjusted at will, without in any way affecting the stability.

This problem, however, encounters a large number of difficulties. For example, it is difficult to incorporate in the mixtures of latex fibrous or voluminous additions and water adsorbent or water attracting additions to obtain an increase in viscosity. The globules of latex are in that case no longer in suspension in a sufficient quantity of water; they collect together, thereby setting up a coagulation and the mixture loses its stability in particular when such mixture is spread, the very slight mechanical work effected on the latter to obtain such spreading facilitating its coagulation.

On the other hand, in the case of preparations of latex used as adhesives or spread over porous surfaces, the surfaces on which they are placed absorb either the water, thereby giving the same result as above, or the mixture, in the event of it not being sufficiently thickened. The mixture of latex in either case no longer enables the expected results to be obtained, in particular the desired adherence is no longer obtained.

Numerous stabilizers have already been proposed for preparations of latex, but none of them has given complete satisfaction. For example, according to a known process, an attempt has been made to make a mixture of latex and hydrosol of silicic acid, which was obtained by means of a solution of silicate treated with a dilute acid. In this case, the acids used already tend to cause a certain agglomeration and, on the other hand, the product obtained is not exempt from the drawbacks mentioned above since in certain cases, it becomes easily dehydrated on porous surfaces or, when it is subjected to a mechanical work; furthermore it exhibits more or less the phenomenon of thixotropy.

The process according to the invention has for its object to obviate the above mentioned drawbacks. For this purpose, it is characterized by the fact that saponifiable resins and soluble salts of silicon are added to the latex or the mixture of latex thereby to obtain a double reaction between these substances.

It could in no way be supposed a priori that a stabilization of the preparations of latex could be obtained by using saponifiable resins, since on the one hand such resins are only slightly soluble or are completely insoluble in water and, on the other hand, a resin alone put in a mixture of latex sooner or later causes the coagulation thereof, which is just the result that it is desired to avoid.

Whereas the salts of silicon, for example in the form of a solution of soluble glass, can be added directly to the latex, it is necessary, for resins, to proceed in another manner, for example to add them in the form of a solution in certain organic solvents such as trichloro-ethylene, carbon tetrachloride, benzene, benzole, etc. In particular, the addition can advantageously be made by dissolving the resin in Turkey-red oil or other alkaline salt of a sulfonated oil. This solution is then added to the latex. It is also possible to emulsify a solution of resin with colloidal substances such as glue, albumen or a soap, and then to add such resin in the form of an emulsion.

By using sulfonates or emulsions of soap, an additional stabilization of the mixtures of latex is obtained, but such stabilization is however not sufficient to permit colophony for example to be added thereto, since the latter can readily cause a coagulation of the latex in the end; on the contrary, the formation of a soap of resin as well as of a silicate gel gives a protective action. Consequently, and this is a feature of the present invention, the emulsifier must be chosen so as to exert a protective action during the time the resin reacts with same and with the silicate and that it then increases the stability of the mixture. In fact, a double or triple system of emulsions of colloids is constituted, such colloids being either formed by reaction or added as emulsifiers and being chosen in such a manner that they mutually protect each other.

By adjusting the quantities of water glass for example between 1 and 12% by weight of the final mixture obtained with a silicate solution having a density of 1.3, as well as the quantities of resin for example between 0.10 to 10% by weight of the final mixture, any desired viscosity of the mixture of latex can be obtained, it being possible even to obtain mixtures which are sufficiently thick to be cut out into the desired shape or to be rolled. This is particularly interesting for the preparation of masses of latex for moulding or rolling.

The present invention enables mixtures to be obtained which have any desired viscosity and, on the other hand, whatever be the viscosity obtained the mixture has a much greater stability than it was possible to obtain with the prior processes and, in particular, it can be subjected to the mechanical work of spreading, it can even be applied on porous surfaces and voluminous, fibrous or water attracting additions can be incorporated therewith, without it losing in any way its stability and still giving a perfectly homogeneous mixture.

The necessary products can be mixed together in any order, for example by first of all mixing the silicates and the resins, with or without additions, the latex only being added afterwards, either immediately or after a gel has already formed.

It is of course understood that the invention not only applies to the natural product but also to all products using a dispersion of natural, artificial or regenerated rubber or a dispersion of other gums. In general, the invention has only been described in an explanatory and nonlimitative manner and any variation or modification of detail could be made therein within its scope.

I claim:

1. A process for increasing the viscosity of latex mixes which comprises adding to said mixes a solution of a saponifiable resin and water glass, and allowing the resin to react with said water glass.

2. A process for increasing the viscosity of a latex mix which comprises adding to said mix a solution of colophony and water glass.

3. A process for increasing the viscosity of a latex mix which comprises adding to said mix an emulsion of a saponifiable resin and water glass.

4. A process for increasing the viscosity of a latex mix which comprises adding to the mix a solution of a saponifiable resin in Turkey-red oil, and also adding to the mix a solution of water glass.

ARTHUR BEHR.